United States Patent [19]

Prakash

[11] Patent Number: 5,748,930
[45] Date of Patent: May 5, 1998

US005748930A

[54] METHOD AND APPARATUS FOR INTERFACING WITH A HOST COMPUTER SYSTEM SHARING TASKS WITH ANOTHER USER ON A CLIENT COMPUTER SYSTEM

[75] Inventor: Alok Prakash, Beaverton, Oreg.

[73] Assignee: Intel Corporation, Santa Clara, Calif.

[21] Appl. No.: 641,432

[22] Filed: May 1, 1996

Related U.S. Application Data

[63] Continuation of Ser. No. 311,876, Sep. 26, 1994, abandoned.

[51] Int. Cl.$^6$ .................................................. G06F 15/00
[52] U.S. Cl. ........................ 395/352; 395/329; 395/330; 395/331; 395/332
[58] Field of Search .................... 395/340, 341, 395/347, 329, 330, 331, 332, 335, 352

[56] References Cited

U.S. PATENT DOCUMENTS

| | | | |
|---|---|---|---|
| 4,994,963 | 2/1991 | Rorden et al. | 364/200 |
| 5,008,853 | 4/1991 | Bly et al. | 364/900 |
| 5,065,347 | 11/1991 | Pajak et al. | 395/159 |
| 5,295,241 | 3/1994 | Eagen et al. | 395/157 |
| 5,297,283 | 3/1994 | Kelly, Jr. et al. | 395/650 |
| 5,307,496 | 4/1994 | Ichinose et al. | 395/650 |
| 5,329,619 | 7/1994 | Page et al. | 395/200 |
| 5,361,349 | 11/1994 | Sugita et al. | 395/600 |
| 5,369,778 | 11/1994 | San Soucie et al. | 395/800 |
| 5,388,196 | 2/1995 | Pajak et al. | 395/153 |
| 5,388,211 | 2/1995 | Hornbuckle | 395/200 |
| 5,392,400 | 2/1995 | Berkowitz et al. | 395/200 |
| 5,421,012 | 5/1995 | Khoyi et al. | 395/650 |
| 5,500,929 | 3/1996 | Dickinson | 395/340 |

OTHER PUBLICATIONS

"Microsoft Windows for Workgroup", Microsoft. 1985–1993. pp. 1–3.

*Primary Examiner*—Kee M. Tung
*Assistant Examiner*—Ba Huynh
*Attorney, Agent, or Firm*—Blakely, Sokoloff, Taylor & Zafman

[57] ABSTRACT

A task sharing manager including control logic for managing task sharing for the user, and an end user interface for interacting with the user is provided to a computer system. The control logic of the task sharing manager keeps track of the sharable active tasks for the user, and present the list along with a number of command options to the user through the end user interface for task sharing. The control logic monitors all user interactions with the end user interface as well as task activities, and responds to these events accordingly. As a result, a user may share task across computer systems in a more efficient and user friendly manner.

10 Claims, 6 Drawing Sheets

METHOD AND APPARATUS FOR INTERFACING WITH A HOST COMPUTER SYSTEM SHARING TASKS WITH ANOTHER USER ON A CLIENT COMPUTER SYSTEM

This is a continuation of application No. 08/311,876, filed Sep. 26, 1994, now abandoned.

BACKGROUND OF THE INVENTION

1. Field of the Invention

The present invention relates to the fields of computer systems, and computer system conferencing. More specifically, the present invention relates to end user interfaces for managing task sharing across computer systems.

2. Background Information:

A number of modern computer systems support task sharing with other computer systems. Particular examples of such computer systems are disclosed in U.S. patent application Ser. No. 08/261,740, filed on Jun. 17, 1994, entitled Apparatus and Method for Application Sharing In a Graphic User Interface, assigned to the assignee of the present invention. Under the disclosed approach, tasks executing on a host computer system may be shared with client computer systems.

Traditionally, including the host-client approach disclosed in the above identified US patent application, task sharing is initiated by user actions on the computer systems where the tasks to be shared are executing. For the purpose of this application, a task is sharable if it has a visible window and it is not owned by any other window. Typically, in a windowed end-user interface environment, for a user to share an active task, the user performs certain interactions with the window of the active task to denote selection of the active task for sharing, such as selection of a menu option or clicking on a button. The selection of the active task for sharing will cause certain pop up dialogues to take place between the active task and the user to identify the computer system with which the active task is to be shared.

If the window of the active task is not the top most window, the user has to "surface" the window of the active task to become the top most window, before performing the above described sequence of user actions to cause the active task to be shared. If the desired task is not active, the user will have to initiate execution of the task, and then perform the above described user actions. The traditional approach for initiating task sharing places the initiation burden on the individual who wishes to have the tasks shared. Typically, some interactions with one or more of the windows of the tasks to be shared are required. When multiples tasks are running, "surfacing" the appropriate windows of the tasks to be shared for interaction can be tedious and painstaking. Additionally the traditional approach is not the most user friendly approach current technology can offer. As computing capacity and connectivity of personal computer systems continue to improve, it is expected that task sharing among computer systems will no longer be a characteristic of personal computing confined only to a few tasks for the sophisticated users; instead, it is expected to become a basic characteristic of personal computing of many tasks for the masses.

Thus, it is desirable that a more efficient and user friendly approach to task sharing be provided. As will be disclosed in more detail below, the present invention provides for a method and apparatus that achieves these and other desirable results.

SUMMARY OF THE INVENTION

These and other desirable results are advantageously achieved by providing a task sharing manager comprising control logic for managing task sharing for the user, and an end user interface for interacting with the user. The control logic of the task sharing manager keeps track of the sharable active tasks for the user, and present the list along with a number of command options to the user through the end user interface for task sharing. The control logic monitors all user interactions with the end user interface as well as task activities, and responds to these events accordingly. As a result, a user may share task across computer systems in a more efficient and user friendly manner.

More specifically, in one embodiment, the task sharing manager identifies the active tasks with visible windows in a display window containing a scrollable list of titles and icons of the active tasks. The task sharing manager constructs the scrollable list using active task and registered icon information maintained by the operating system, as well as scanning the executable files of the active tasks for unregistered icons. Furthermore, the task sharing manager provides a command button in the display window for initiating sharing of any one of the identified active tasks, or terminating sharing of any one of the shared tasks.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention.

Figure 1:
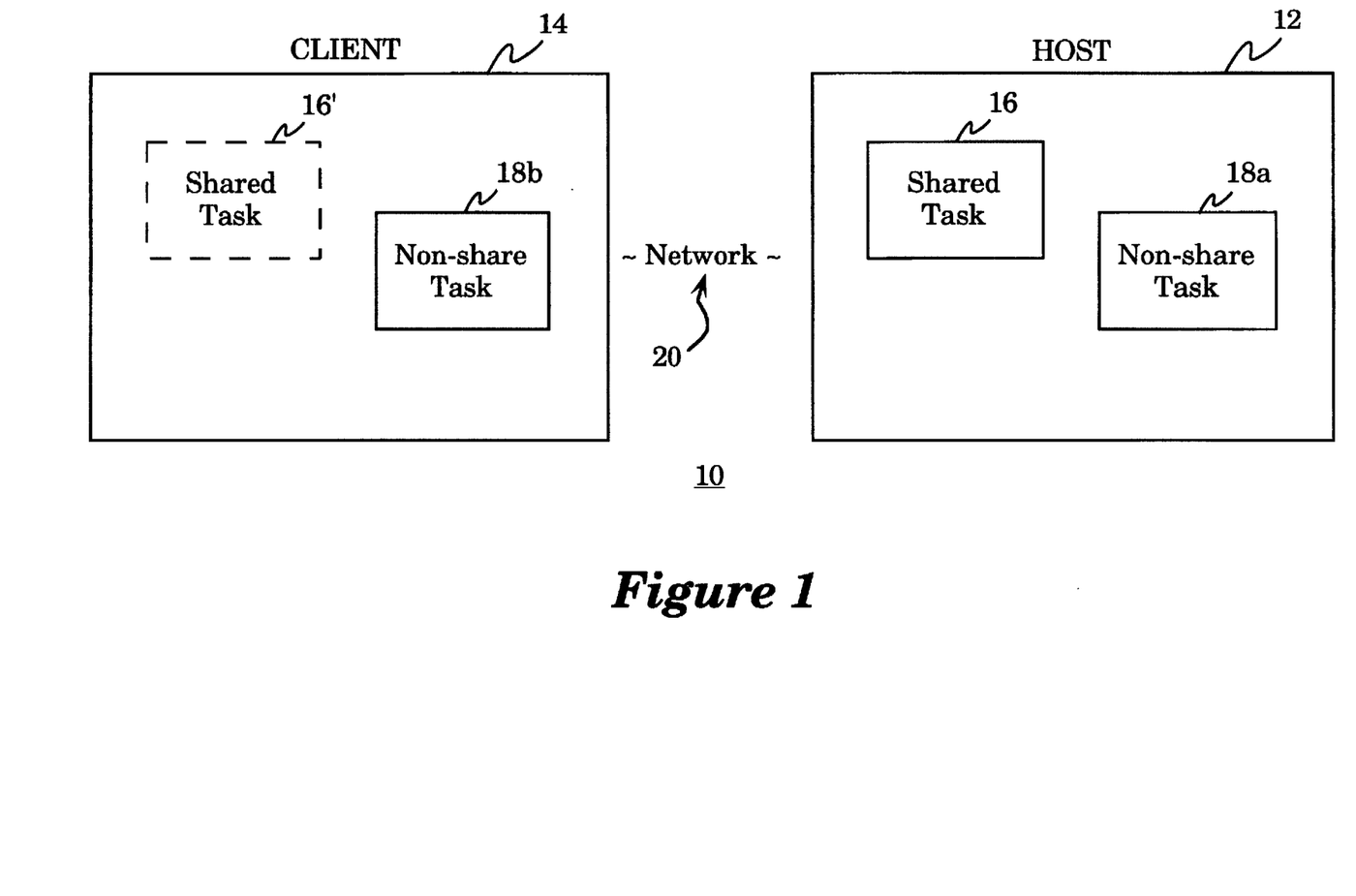
FIGS. 1 illustrates an exemplary network of computer systems incorporating the teachings of the present invention.

Referring now to FIG. 1, a diagram illustrating an exemplary network of computer systems incorporating the teachings of the present invention is shown. As illustrated, the network 10 comprises a host computer system 12 and a client computer system 14, inter-connected with each other via a network media 20. The host computer system 12 includes an executing task 16 shared with the client computer system 14, and another executing task 18a not shared with any other computer systems. Shared task 16' is depicted on the client computer system 14 with dotted lines to denote the fact that only the displayed images of shared task 16 is reflected on the client computer system 14. The code of shared task 16 is executed entirely on the host computer system 12, and not on the client computer system 14 at all. Additionally, the client computer system 14 may further include its own non-share task 18b.

For ease of understanding the present invention, both the host and client computer systems 12 and 14 are illustrated with one shared task 16, and one non-share task 18a or 18b. Based on the descriptions to follow, it will be appreciated that the host and client computer systems 12 and 14 may include more or less shared as well as non-share tasks, 16, 16', 18a and 18b. Additionally, based on the description to follow, it will also be appreciated that a computer system may be a host and a client computer system 12 and 14 at the same time.

The network media 20 is intended to represent a broad category of communication media well known in the art, including but not limited to local area network (LAN) such as Ethernet, wide area network (WAN) such as SNA, or a general switching telephone network (GSTN).

Figure 2:
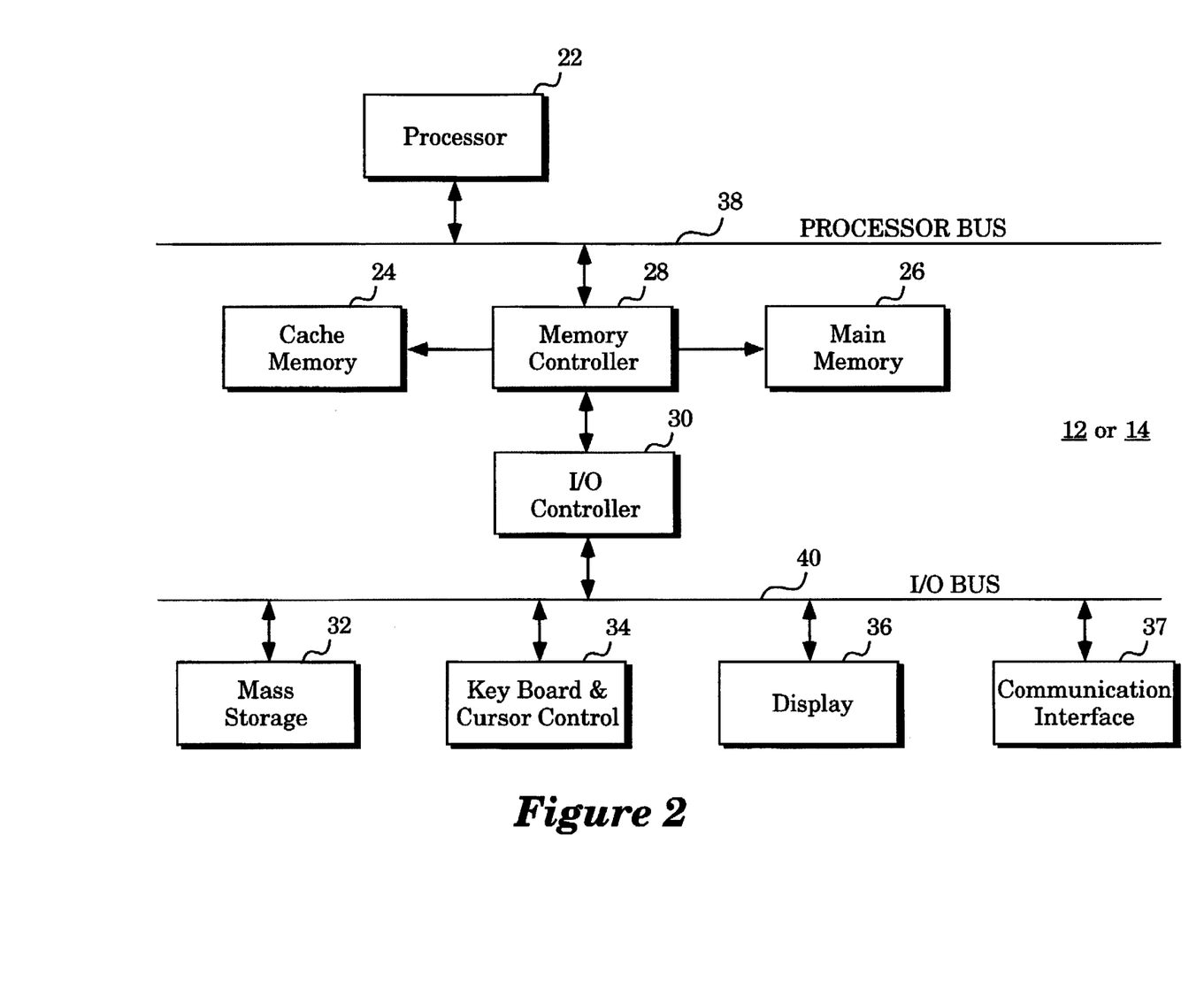
FIG. 2 illustrates the hardware components of the computer systems of FIG. 1 in further detail.

Referring now to FIG. 2, a block diagram illustrating the hardware components of the computer systems of FIG. 1 is shown. The host/client computer system 12 or 14 includes a processor 22, a cache memory 24, a main memory 26, and a memory controller 28, coupled to each other and a processor bus 38 as shown. The host/client computer system 12 or 14 further includes an I/O controller 30, a number of mass storage devices 32, keyboard and cursor control devices 34, a display 36, and a communication interface 37, coupled to each other and an I/O bus 40 as shown. The memory and I/O controllers 28 and 30 are also coupled to each other.

The various elements 22–40 are intended to represent a broad category of similar elements found in many computer systems. Their primary functions and constitutions are well known and will not be further described. Additionally, based on the descriptions to follow, it will be appreciated that the present invention may be practiced with these elements 12–30 coupled to each other in other architectural manner, without some of these elements 12–30, and with other additional hardware elements. Furthermore, while for ease of understanding the present invention, both the host and the client computer systems 12 and 14 are being described as having similar hardware components, based on the description to follow, it will also be appreciated that the present invention may be practiced with the two computer systems 12 and 14 having different hardware components.

Figure 3:
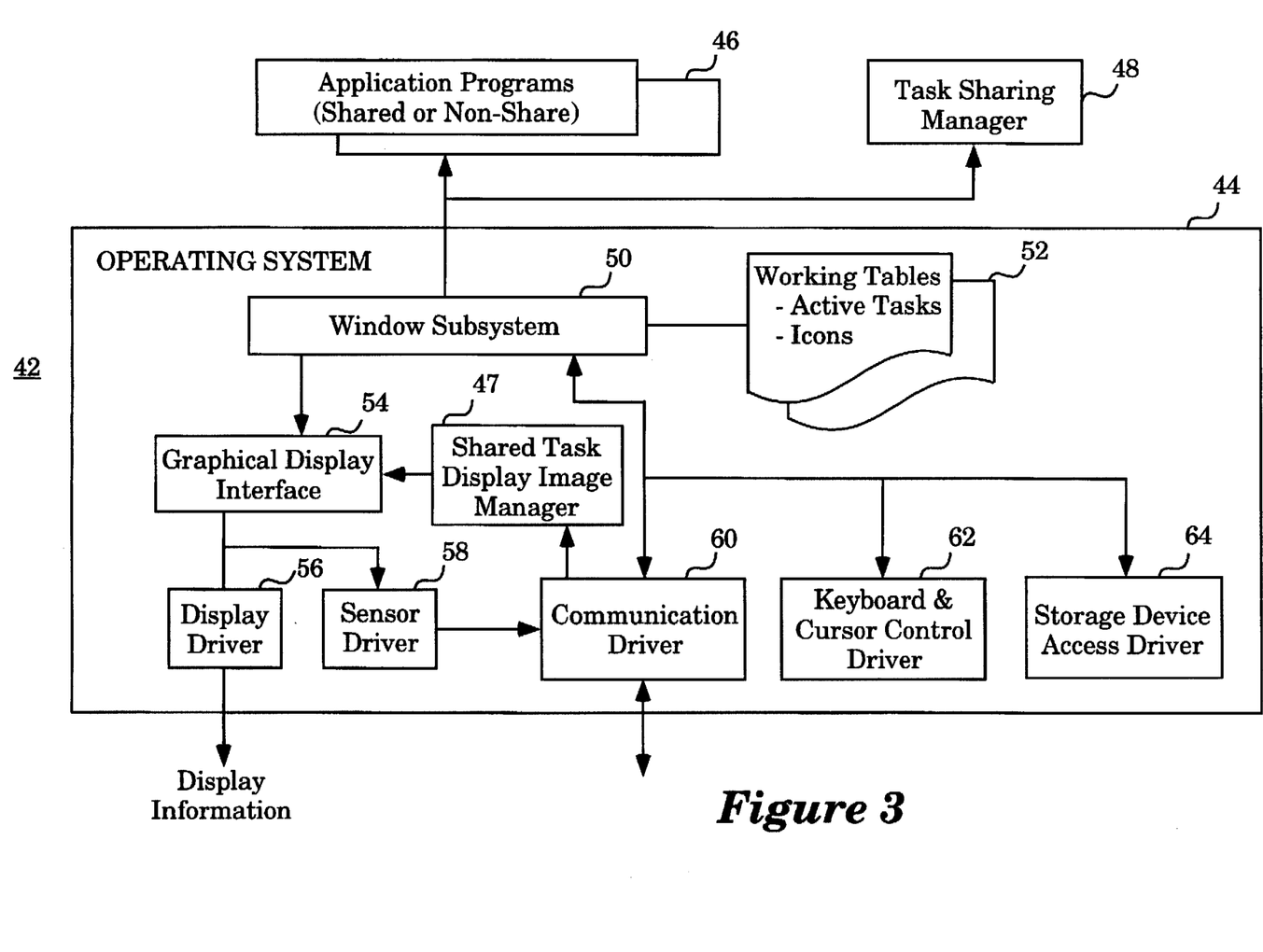
FIG. 3 illustrates the software components of the computer systems of FIG. 1 in further detail.

Referring now to FIG. 3, a block diagram illustrating the software components of the host/client computer systems of FIG. 1 is shown. The host/client computer system 12 or 14 includes an operating system 44, and a number of shared or non-share application programs 46. Additionally, the host computer system 12 further includes the task sharing manager 48 of the present invention, and the client computer system 14 further includes a shared task display image manager 47.

The operating system 44 includes a window subsystem 50 for managing windowed displays of the application programs 46. The window subsystem 50 has a number of working tables 52 for storing various working data. In particular, the working tables 52 include a table of all the active tasks, and a table of icons registered by executable tasks on the system.

Additionally, the operating system 44 includes a communication driver 60, a keyboard and cursor control driver 62, and a storage device access driver 64. The communication driver 60 facilitates sending and receiving communications through the network interface 37. The keyboard and cursor control driver 62 facilitates input of keystrokes and cursor movements from the input and cursor devices 34. The storage device access driver 64 facilitates reading and writing data from and to storage devices 32.

Furthermore, the operating system 44 includes a graphical display interface 54, a display driver 56, and a sensor driver 58. The graphical display interface 54 facilitates generation of graphical displays, whereas the display driver 56 facilitates actual rendering of display on the display device 36 of the system. The sensor driver 58 monitors calls to the display drivers 56 for displaying information on behalf of a shard application 46 on the host computer system 12, and in response inform the shared task display image manager 47 on the client computer system 14 accordingly utilizing the communication driver 60.

The task sharing manager 48 of the present invention will be described in more detail below with additional references to the remaining figures. For more detailed descriptions of the shared task display image manager 47, and the sensor driver 58, see the above identified US patent application, which is hereby fully incorporated by reference. Otherwise, the application programs 46 and the operating system 44, including its window subsystem 50, the window subsystem's working tables 52, the graphical display interface 54, and the various drivers 56, and 60–64, are intended to represent a broad category of similar elements found in many computer systems. Their functions and constitutions are well known, and will not be further described.

Figure 4:
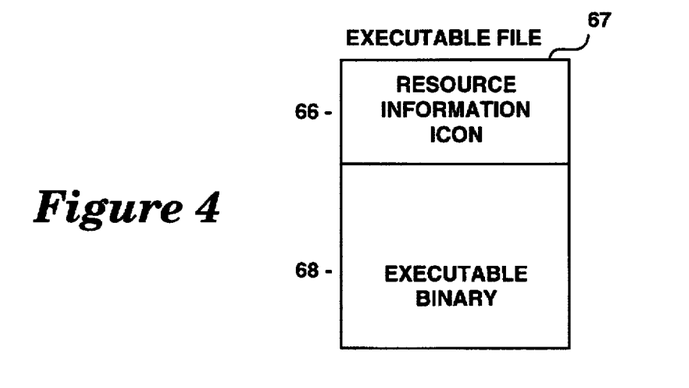
FIG. 4 illustrates one embodiment of an executable file.

Before describing the task sharing manager 48 of the present invention in detail, refer now briefly to FIG. 4, wherein an exemplary format of a compiled executable file on the host/client computer system 12 and 14 is illustrated. Each compiled executable file 67 includes the executable binary 68, and in addition resource information 66 required by the executable binary 68. In particular, the resource information 66 includes the icon definition of the executable file 67.

Having now described the general system architecture and the relevant elements of the host and client computer systems 12 and 14, the task sharing manager of the present invention will be described. The end-user interface of the task sharing manager 48 will first be described with references to FIG. 5, wherein one embodiment of the main display window 70 of the task sharing manager 48 is shown. Then, the control logic of the task sharing manager 48 will be described with references to FIG. 6, wherein one embodiment of the operation flow of the control logic is shown.

Figure 5:
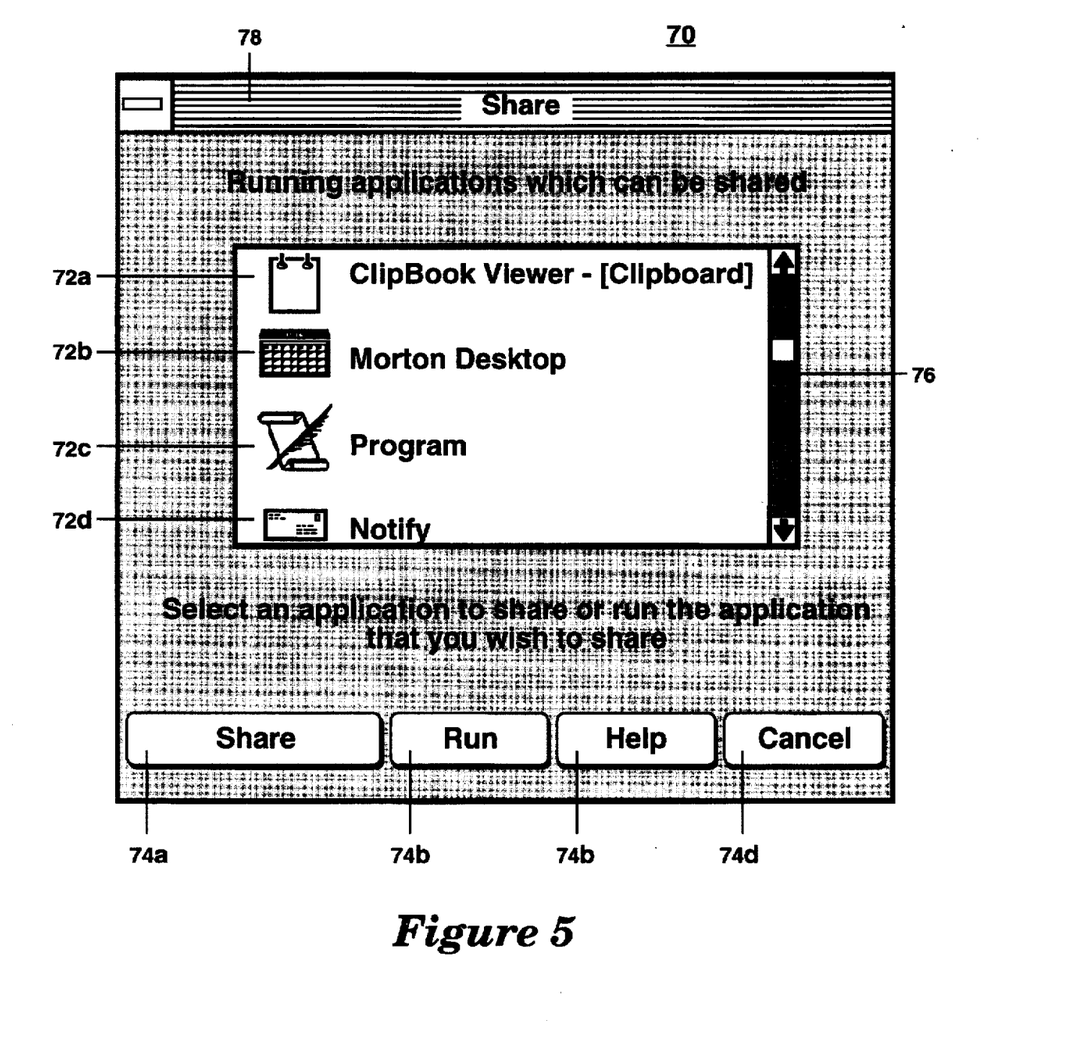
FIG. 5 illustrates one embodiment of the primary window of the end user interface of the task sharing manager of the present invention.

As illustrated in FIG. 5, the main display window 70 displays a list of sharable active tasks 72a–72d currently running on the host computer system 12. Additionally, the main display window 70 includes a number of command buttons 74a1–74d. In particular, the command buttons 74a–74d include a task sharing command button ("share") 74a, and a task sharing termination command button ("cancel") 74d. Preferably, the command buttons 74a–74d also include a "run" command button 74b and a "help" command button 74c. Furthermore, the main display window 70 preferably includes a title 78, and a scroll bar 76.

A user on the host computer system 12 selects a sharable active task 72a–72d for sharing by placing the cursor (not shown) on the sharable active task 72a–72d, and depressing a switch on the cursor control device 34, e.g. clicking on the button of a mouse. Preferably, the selected sharable active task 72a–72d will be highlighted to denote its selection. The user then initiates the sharing by moving the cursor onto the "share" command button 74a, and depressing the switch on the cursor control device 34 again.

In response, the selected sharable active task 72a–72d will be shared with the client computer system 14. Preferably, the shared active task 72a–72d will be highlighted to denote the fact that it is being shared with a client computer system 14. Furthermore, in the event that the host computer 12 is not connected to a client computer 14, the user will be prompted to make the connection.

Alternatively, if a "run" command button 74b is provided, the user may initiate sharing of a sharable inactive task directly, by placing the cursor on to "run" command button 74b, and depressing the switch on the cursor control device 34. In response, the operating system's task running service may be used to start execution of a sharable inactive task. Upon starting execution of the sharable inactive task, control may be returned to the main display window 70, with a refreshed sharable active task list including the most recently activated task, for the user to initiate sharing of the most recently activated task. Preferably, sharing of the most recently activated task is made automatic without further interaction required of the user.

Similarly, a user on the host computer system 12 selects a shared active task 72a–72d for termination by placing the cursor (not shown) on the shared active task 72a–72d, and depressing a switch on the cursor control device 34, e.g. clicking on the button of a mouse. Preferably, the selected shared active task 72a–72d will be highlighted to denote its selection. The user then terminates the sharing by moving the cursor onto the "cancel" command button 74d, and depressing the switch on the cursor control device 34 again. In response, sharing of the selected shared active task 72a–72d will be terminated. Preferably, the termination request is confirmed before it is actually effectuated.

The "help" command button 74c and the scroll bar 76 function in similar manners as other like elements found in many windowed displays of applications on many computer systems. They are well known in the art and will not be further described.

Figure 6:
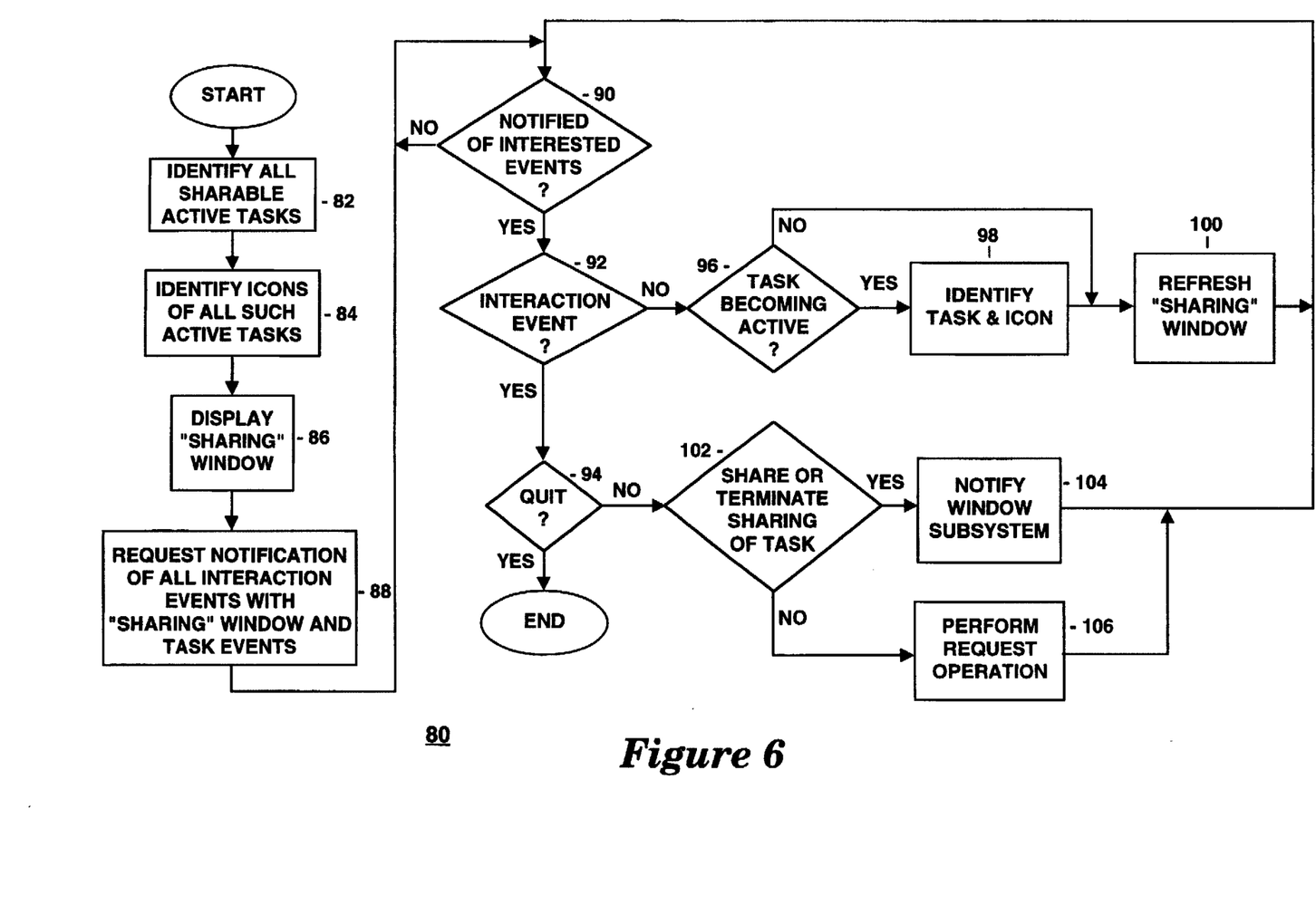
FIG. 6 illustrates one embodiment of the operational flow of the control logic of the sharing manager of the present invention.

As illustrated in FIG. 6, upon having been launched by the operating system 44, the task sharing manager 48 identifies all sharable active tasks currently executing on the system accessing the active task table 52 of the window subsystem 50 (step 82). Then, the task sharing manager 48 identifies the icons corresponding to the sharable active tasks by accessing either the working tables 52 of the window subsystem 50 for the registered icons, or scanning the executable files 67 directly for the unregistered icons (step 84).

Figure 7:
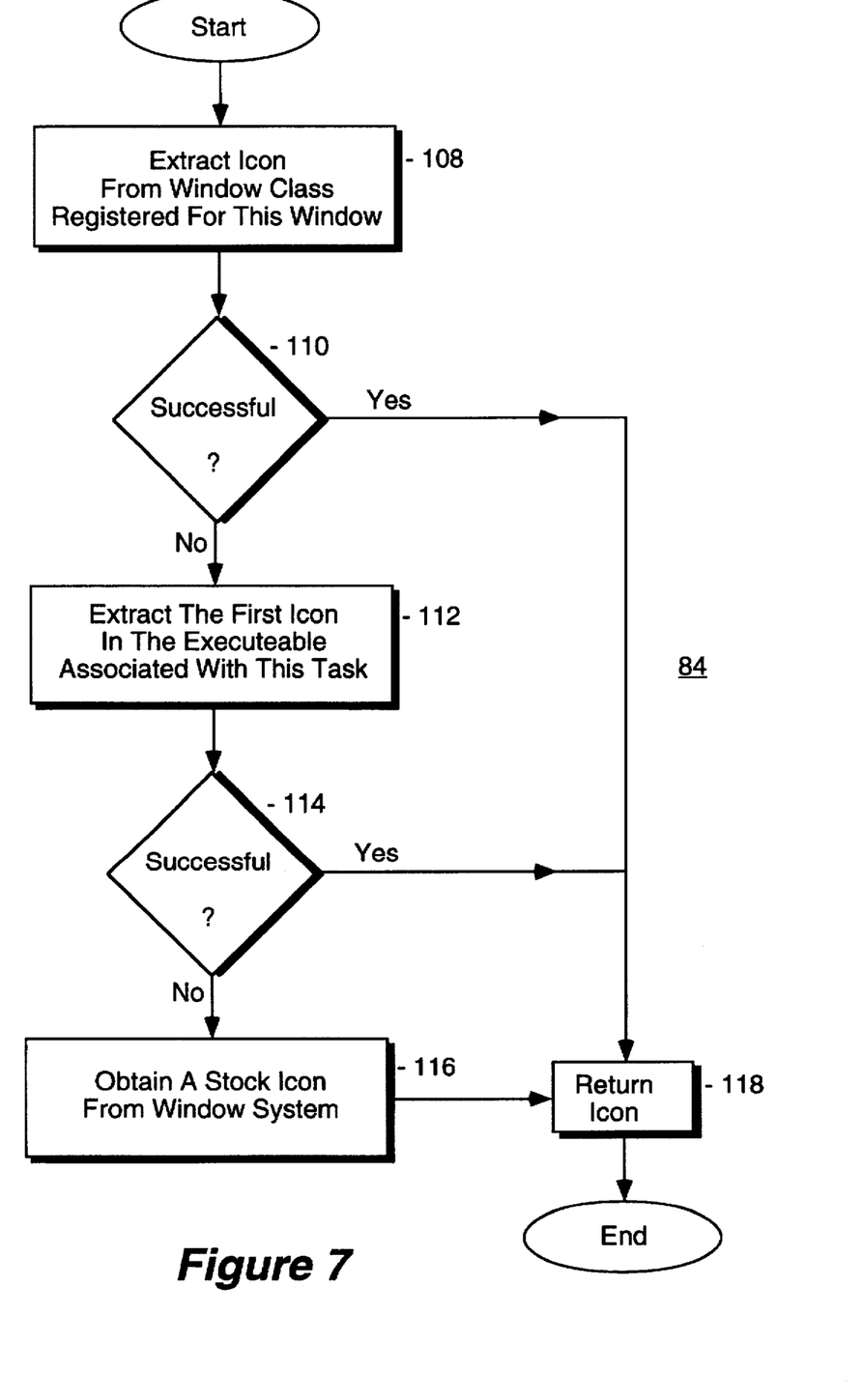
FIG. 7 illustrates the manner in which the icon extraction step of FIG. 6 is performed in a particular embodiment.

FIG. 7 illustrates one manner in which the icon extraction step (step 84) of FIG. 6 is performed for a particular embodiment designed for the Microsoft Window environment (Window is a trademark of Microsoft Corporation). As illustrated, the task sharing manager 48 first accesses the window class registered for the window to extract the icon (step 108). If the extraction is successful (step 110), the task sharing manager 48 returns the extracted icon (step 118). If the extraction is unsuccessful (step 110), the task sharing manager 48 accesses the first icon in the executable file associated with the task to extract the icon (step 112). Similarly, if the extraction is successful (step 114), the task sharing manager 48 returns the extracted icon (step 118). However, if the extraction is also unsuccessful (step 114), the task sharing manager 48 obtains a stock icon from the window system (step 116). Upon doing so, the task manager 48 returns the stock icon (step 118).

Referring back to FIG. 6, upon having collected all the registered as well as unregistered icon information of the sharable active tasks 72a–72d, the task sharing manager 48 displays its main display window 70 listing all the sharable active tasks 72a–72d and making available the various user interaction window elements, command buttons 74a–74d etc. (step 86).

In one embodiment, the task sharing manager 48 is launched by the operating system 44 as a result of specific user instruction. In another embodiment, the task sharing manager 48 may also be launched automatically by the operating system 44 as an integral part of the system start up process. In yet another embodiment, the task sharing manager 48 may be incorporated as an integral part of an improved task manager replacing the window subsystem's task manager. For example, for the embodiment designed for the Microsoft Windows environment, the function of the task sharing manager 48 may be incorporated as part of a modified version of Windows' task manager and automatically launched by making the appropriate substitution in the "boot" section of "SYSTEM.INI".

Next, the task sharing manager 48 requests the window subsystem 50 to notify it of all user interaction events with its display windows 70, 110, 130, and all task activation and termination events (step 88). Upon making such request, the task sharing manager 48 monitors for these notifications (step 90).

In one embodiment, the task sharing manager 48 is notified by the window subsystem 50 through messages.

Upon being notified by the window subsystem 50 of one of its interested events, the task sharing manager 48 determines if the event is an interaction event with one of its display windows 70, 110 or 130 (step 92). If the event is determined to be a task event, the task sharing manager 48 further determines if the task event is a task activation event or a task termination event (step 96). If the task event is a task activation event, then the task sharing manager 48 identifies the newly activated task and its icon (step 98). Upon determining the task event as a task termination event, or identifying the task that was just activated and its icon, the task sharing manager 48 then refreshes its main display window 70 accordingly (step 100). Having refreshed its main display window 70, the task sharing manager 48 continues execution at step 90.

On the other hand, if it was determined at step 92 that the event is an interaction event, the task sharing manager 48 determines if the user is trying to terminate execution of the task sharing manager 48 (step 94). If the user is trying to terminate execution of the task sharing manager 48, it terminates as instructed. Otherwise, the task sharing manager 48, determines if the user is trying to share a selected active task, i.e. "depressing" the "share" command button 74a, or trying to terminate a selected share task, i.e. "depressing" the "cancel" command button 74d (step 102). If the user is trying to share the selected active task or terminate the selected shared task, the task sharing manager 48 notifies the window subsystem 50 accordingly (step 104). Otherwise, the task sharing manager 48 performs the requested operation (step 106). Either case, upon notifying the window subsystem 50 or performing the requested operation, the task sharing manager 48 continues at step 90.

Thus, a method and apparatus for interacting with a user on a host computer system sharing tasks with a client computer system is described. While the method and apparatus of the present invention has been described in terms of the illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. In a computer system comprising a plurality of active tasks sharable with a compatibly equipped client computer system coupled to the computer system, a method for interacting with a first user of the computer system to selectively initiate sharing of the active tasks, or to selectively terminate sharing of the sharable active tasks currently being shared, said method comprising the steps of:

a) gathering up control information about the active tasks currently being executed on the computer system that are sharable, and identifying the sharable active tasks in a consolidated manner to the first user, by a task sharing manager, using support from a local operating system only;

b) enabling the first user to interact with the consolidated sharable active task identifications to initiate sharing of the identified sharable active tasks, or to terminate sharing of the sharable active tasks currently being shared, without requiring the first user to bring into view end user interface windows of the affected active tasks, by the task sharing manager;

c) causing the sharing initiated sharable active tasks to be shared, and causing sharing of the sharable active tasks that are currently shared to be terminated as instructed by the first user, by the task sharing manager, using application sharing service of the local operating system, wherein the application sharing service is equipped to cooperate with a complementary counterpart on the client computer system to enable a second user on the client computer system to interact with the shared active tasks, with the shared active tasks executing on the computer system only; and d) requesting the local operating system by the task sharing manager that the task sharing manger be notified of all task activation and termination events, and upon receipt of notification of such an event, the task sharing manager updating the gathered control information for the sharable active tasks, and refreshing the sharable active tasks identified for the first user.

2. The method as set forth in claim 1, wherein, step (a) comprises identifying the sharable active tasks to the first user in a display window containing a scrollable list of titles and icons of the sharable active tasks by the task sharing manager.

3. The method as set forth in claim 2, wherein, the local operating system is equipped to maintain locally a first table of the active tasks, and a second table of registered icons of registered ones of the active tasks, and executable files of the active tasks include icon information of the active tasks; and step (a) comprises gathering titles and icons of the sharable active tasks by the task sharing manager using the first and second tables and the executable files.

4. method as set forth in claim 2, wherein, step (b) comprises providing a number of user interaction elements on the display window containing the scrollable list of titles and icons of the sharable active tasks by the task sharing manager.

5. The method as set forth in claim 4, wherein step (c), further comprises the task sharing manager requesting the local operating system to notify the task sharing manager of all user interactions with the display window, and upon notification of such user interactions, the task sharing manager responds to the user interactions accordingly, including invoking the application sharing service of the local operating system to start sharing of a sharable active task or to terminate sharing of a sharable active task currently being shared as appropriate.

6. A computer system comprising:

a) an execution unit for executing programs during operation;

b) a storage unit coupled to the execution unit having stored therein b.1) an executable file of a control program for execution by the execution unit during operation, when executed, the control program, cooperating only with a local operating system being executed by the execution unit, exclusively facilitates initiation and termination of sharing of sharable application programs being executed by the execution unit, with a complementarily equipped client computer system coupled to the computer system, for a first user of the computer system, the facilitation including continuous gathering of control information of the sharable application programs being executed, identifying for the first user the sharable application programs being executed in a consolidated manner, allowing the first user to provide sharing directions without having to bring into view end user interface windows of the affected application programs, and instructing application sharing service of the local operating system accordingly responsive to the sharing directions provided, the control program requesting the local operating system to notify the control program of all program execution starting and termination events, and upon receipt of notification of such an event, the control program updating the gathered control information for the sharable application programs being executed, and refreshes the sharable application programs identified for the first user, and the application sharing service being equipped to cooperate with a complementary counterpart on the client computer system to enable a second user on the client computer system to interact with the shared application programs, with the shared application programs executing on the computer system only.

7. The computer system as set forth in claim 6, wherein, when executed, the control program identifies the application programs being executed that are sharable to the first user, using a display window containing a scrollable list of titles and icons of the sharable application programs being executed.

8. The computer system as set forth in claim 7, wherein, the storage unit further having stored therein b.2) excutable files of the local operating system to be executed by the execution unit during operation, wherein when executed, the local operating system maintains locally a first table of all programs being executed, including sharing information of the programs, and a second table of registered icons of the programs if the programs had previously registered the programs' icons with the local operating system, and b.3) executable files of the programs including icon information of the programs;

the control program, when executed, identifies the titles and icons of the sharable application programs being executed, using the first and second tables, and the executable files.

9. The computer system as set forth in claim 7, wherein, when executed by the execution unit, the control program enables the first user to initiate sharing of the sharable application programs being executed, or to terminate sharing of the sharable application programs being executed and shared with the client computer system, by providing a number of user interaction elements on the display window containing the scrollable list of titles and icons of the sharable application programs being executed.

10. The computer system as set forth in claim 9, wherein, when executed by the execution unit, the control program requests the local operating system to notify the control program of all user interactions with the display window, and upon notification of such user interactions, the control program responds to the user interactions accordingly, including invoking the application sharing service of the local operating system to start sharing of a sharable application program being executed or to terminate sharing of a sharable application program being executed and shared with the client computer system as appropriate.

* * * * *